United States Patent Office 3,709,869
Patented Jan. 9, 1973

3,709,869
REACTIVE TRIAZINE AZO DYESTUFFS
Jorge Aurelio Mazza, Av. Libertador Gral., San Martin 2687, Buenos Aires, Argentina
No Drawing. Filed Sept. 30, 1969, Ser. No. 862,439
Claims priority, application Argentina, Oct. 1, 1968, 216,848
Int. Cl. C09b 62/00, 62/02, 62/08
U.S. Cl. 260—153  4 Claims

ABSTRACT OF THE DISCLOSURE

Reactive fiber dyes having the structural formula:

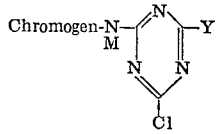

wherein the chromogen is an azo or anthraquinone dye; Y is Cl,

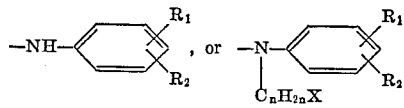

M is H or $-C_nH_{2n}X$; $R_1$ and $R_2$ are the same or different and represent H, or an alkyl, sulfo, nitro, halo, carboxy, alkoxy, or like group; X is sulfo, carboxy, hydroxy, or a low molecular weight, strongly polar organic group; and $n$ is one or two, M being H only when Y is

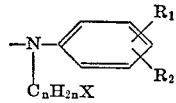

processes for preparing such dyes; and processes for dyeing vegetable fibers, regenerated cellulose, animal fibers, and synthetic polyamide fibers with purity and brightness of shade and good fastness to wet treatments.

BACKGROUND OF THE INVENTION

The present invention relates to new fiberreactive azo dyes containing sulfonated halotriazine groups and to a process for dyeing textile fibers with said dyes.

British Pat. No. 209,723 describes a group of azo dyes characterized chemically in that they are formed by the combination of any known azo dye with one or more molecules of cyanuryl chloride, which may be substituted in turn by any other radical.

British Pat. No. 467,815 describes a group of anthraquinone dyes characterized chemically in that they are formed by the combination of anthraquinone derivatives containing a reactive amino group and cyanuryl chloride. One or bothe of the 2-chlorine atoms of the compound obtained may be substituted in turn by other radicals.

Two of the structures claimed in the patents mentioned are, for example, the following:

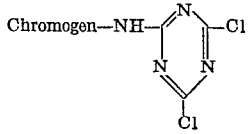

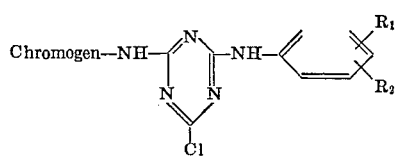

in which the chromogen is an azo dye or an anthraquinone derivative, and $R_1$ and $R_2$ represent a hydrogen atom or an alkyl, sulfonic, nitro, halogen, carboxyl, methoxyl, or similar radical.

Due to the presence of the triazine group, all the above-mentioned dyes have the specific property of reacting chemically during the dyeing or printing process, giving dyed or printed products of high fastness.

On the basis of this fundamental property and within the chemical structures noted above, a wide range of dyes, which are referred to precisely as reactive, has been developed throughout the world.

The high reactivity of the above-mentioned dyestuffs causes their partial decomposition by hydrolysis during the dyeing or printing process, degradation compounds being formed which are apt to stain the dyed or printed material.

In order to avoid such stains or discoloration, recourse is had to special dyeing and printing processes, prolonged and troublesome washing of the dyed material and also the chemical modification of the dyestuff, with the aim of obtaining dyes which give by hydrolytic degradation compounds which can easily be eliminated by washing and rinsing of the dyed or printed material.

A common remedy consists in employing chromophore groups (azo or anthraquinone groups) containing sulfonic and/or carboxylic radicals, which groups increase the solubility of the same and at the same time reduce their substantivity. This facilitates the elimination by washing of any unfixed residues of dye and of degradation products thereof.

In order to regulate the substantivity of the finished reactive dye, sulfonic or carboxylic groups are sometimes incorporated in the non-chromogenic radical joined to the triazine group, these sulfonic or carboxylic groups being directly attached to a benzene or naphthalene radical.

Since the sulfonic radical is the most frequently employed, the most common structures of the known reactive triazine dyes are consequently as follows:

Dichlorotriazine

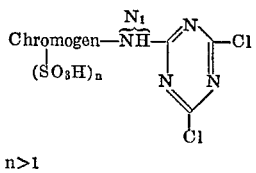

n>1

Monochlorotriazine

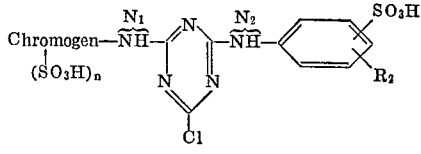

n>1 in which the chromogen is a metallized or unmetallized azo dye or an anthraquinone derivative, and $R_2$ has the significance hereinbefore given.

The azo chromogen is of the formula $$A-N=N-B-$$

wherein A is a substituted or unsubstituted phenyl, naphthyl or pyrazolonic group and B is a substituted or unsubstituted phenyl or naphthyl group. When A and/or B are substituted, the substituents can be the same or different and can be selected from H, $SO_3H$, $CH_3$, $C_2H_5$, $NO_2$, Cl, Br, COOH, $OCH_3$, and $OC_2H_5$.

Another problem created by the high reactivity of the dyestuffs mentioned is the instability of the dyeing baths and the printing pastes. In fact, the reaction of the dye with the conventional aqueous medium is rapid and produces decomposition thereof in a relatively short time.

THE INVENTION

A new family of halotriazine azo dyes has now been discovered, the use of which in the dyeing of textile fibers results in substantial improvements, since certain products derived by the degradation thereof can easily be eliminated by washing, with a consequent improvement in the staining or discoloration problem, while moreover there is greater stability of the printing pastes and the dye baths prepared with the same.

The reactive dyes of the present invention are triazine dyes modified by the presence of —$(CH_2X)$ or —$(C_2H_4X)$ radicals in the molecule thereof, either in the nitrogen bridge ($N_1$) linking the chromogen to the triazine group, or in the amino group ($N_2$) which replaces one of the chlorine atoms of the triazine nucleus.

The novel dyes according to the present invention can be generally represented by the following structural formula:

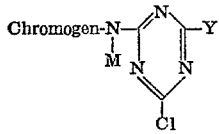

wherein the chromogen is a metallized or unmetallized azo dye or an anthraquinone derivative; Y is Cl,

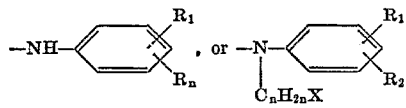

M is H or —$C_nH_{2n}X$; $R_1$ and $R_2$ are the same or different and represent H or an alkyl, sulfo (—$SO_3H$), nitro, halo, carboxy, alkoxy, or like group; X is sulfo (—$SO_3H$), carboxy, hydroxy, or a low molecular weight, strongly polar organic group; and $n$ is 1 or 2, M being H only when Y is

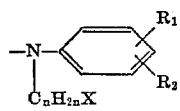

The present invention also contemplates processes for producing such dyes and dyeing processes utilizing such novel triazine dyes.

More specifically, the novel reactive dyes which enter into the dye baths of the process of the present invention have the following chemical structures:

I
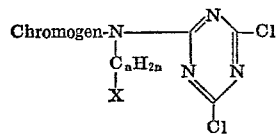

II
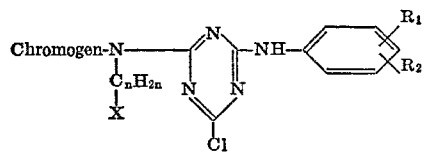

III
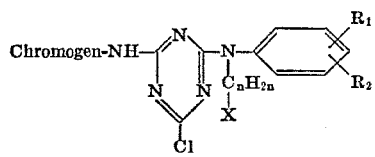

in which the chromogen, the radicals $R_1$, $R_2$ and X, and $n$ have the significance hereinbefore indicated.

As noted above, X is sulfonic, carboxyl, or hydroxyl or an organic radical which is low molecular weight and strongly polar. The preferred substituents on the bridge nitrogen accordingly include:

—$CH_2SO_3H$

—$C_2H_4SO_3H$

—$CH_2OH$

—$C_2H_4OH$

—$CH_2COOH$

—$C_2H_4COOH$

The chromogen group can contain any of the radicals which are usual in the azo dyes or anthraquinone derivatives which constitute the same, such as sulfonic or carboxylic radicals, metallic bridges or complexes, and the like.

The preferred dyes according to the present invention are reactive dyes containing azo or anthraquinone chromogen groups. The azo chromogen group may be any one of those known, being required to comply with the sole condition that as precursors of the triazine dyes employed in the process of this invention they must have a radical capable of reacting with one of the chlorine atoms of cyanuryl chloride.

If the azo chromogen group has suitable radicals, it may be metallized before it is used in the manufacture of the reactive dye, in accordance with conventional processes. This metallization may also be effected during the course of the manufacture of the reactive dye or after the same has been completed. All the desirable azo chromogens hereinbefore mentioned are obtained by reaction of the diazo of an organic amine with a suitable coupler.

Practically all the known organic amines give diazo derivatives of interest and there may be mentioned by way of example the mono- and diamines derived from substituted or unsubstituted benzene and naphthalene. Thus, for example, aniline, meta-phenylenediamine, para-phenylenediamine, meta-aminoacetanilide, para-aminoacetanilide, 2,4- and 2,5-diaminobenzenesulfonic acids, sulfonic meta- and para-aminoacetanilide, disulfonic meta- and para-aminoacetanilide naphthylamine-monosulfonic acids, naphthylamine-disulfonic and -trisulfonic acids, and the like, give valuable products.

As couplers which produce valuable dyes there may be mentioned, among all the known ones customarily employed, the derivatives of the naphthols, such as 1-amino-8-hydroxynaphthalene-3,6-disulfonic acid 2-amino-5-naphthol-7-sulfonic acid, 3-amino-5-naphthol-7-sulfonic acid and all those other products whose structure corresponds to that of a mono- or dihydroxynaphthalene, it being possible for said molecule to contain in addition sulfonic, amino, acetylamino, alkyl, nitro, halogen, methoxy, and like groups.

Another group of couplers which produces valuable dyes is that of the pyrazolones, all of which are of interest. There may be mentioned, inter alia, 1-(2,5-dichloro-4-sulfophenyl)-3-methyl - 5-pyrazolone, p-sulfophenyl-3-carboxy-5-pyrazolone, amino J pyrazolone, and the like.

Combination between the chromogen group and the triazine radical may be effected equally well through the residue of the original coupler or through the residue of the original diazo. Both possibilities give rise to valuable dyes.

A simple process for manufacturing the new dyestuffs mentioned consists in first preparing the chosen chromogen. The —$(CH_2X)$ or —$(C_2H_4X)$ radical is incorporated in this chromogen by means of a suitable chemical treatment. Finally, the above product is condensed with cyanuryl chloride. Thus, for example, the diazo of metamino-delta-anilide is coupled with 1-(2,5-dichloro- 4-sulfophenyl)-3-methyl-5-pyrazolone, the following interesting chromogen being obtained by hydrolysis:

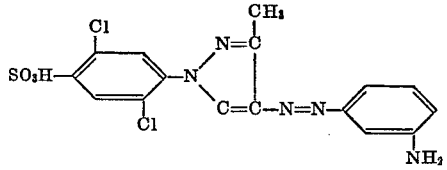

This chromogen, in aqueous solution, is reacted with formaldehyde and sodium bisulfite, an N-omega-methylsulfone derivative of the following formula being obtained:

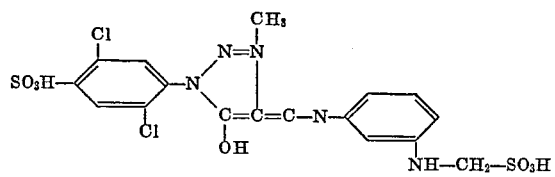

This derivative is then reacted with cyanuryl chloride, there being obtained one of the reactive dichlorotriazine dyes which have been mentioned:

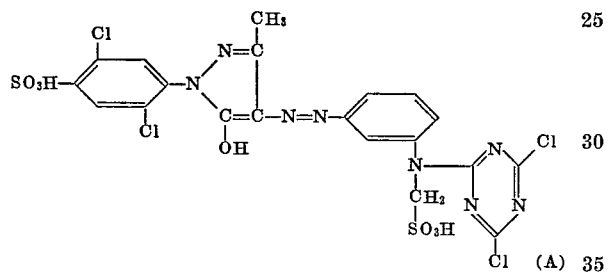

(A)

If the above product is reacted with sulfanilic acid, there is otbained another of the reactive monochlorotriazine dyes belonging to the family indicated, which contains the omega substitution in the nitrogen bridge Nl which joins the chromogen to the triazine radical:

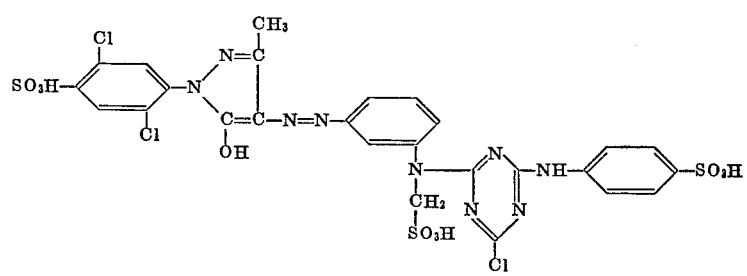

(B)

Another variant of the process for obtaining the new reactive dyes which are characterised in that they are isomers of the preceding ones consists in first preparing a conventional reactive dichlorotriazine dye by any of the known methods and then incorporating the —(CH$_2$X) or —(C$_2$H$_4$X) radical therein by a suitable chemical process. Thus, for example, one of the new reactive dyes to which this invention relates, which is isomeric with dye (B) hereinbefore mentioned, is obtained if the following procedure is followed:

The diazo of 1-acetylamino-3-aminobenzene-4-sulfonic acid is coupled with 1-(2,5-dichloro-4-sulfophenyl)-3-methyl-5-pyrazolone, the following chromogen being obtained by hydrolysis:

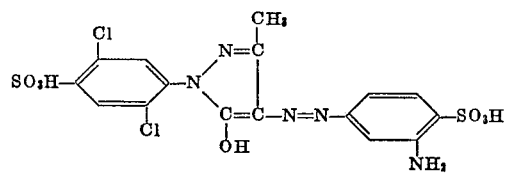

If the above chromogen is reacted with cyanuryl chloride by known methods, the following dichlorotriazine dye is obtained:

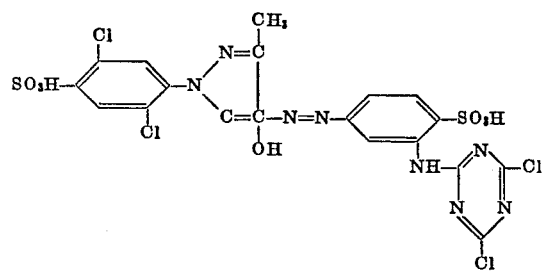

By reacting omega-sulfomethylaniline with this last-mentioned dye, there is obtained one of the new and valuable reactive dyes which can be used in the process of this invention:

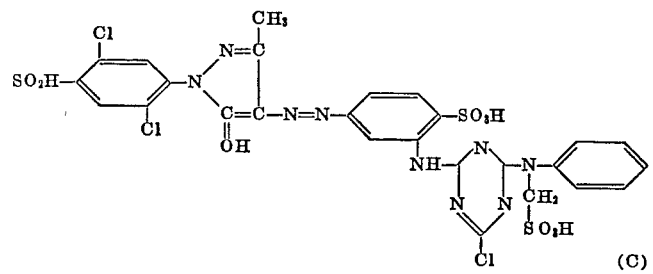

(C)

A third way of obtaining these new reactive dyes consists in producing the chromogen group by employing an intermediate (diazo or coupling) already containing the —(CH$_2$X) or —C$_2$H$_4$X) radical. Thus, for example, a chromogen of this type is obtained by reacting the diazo of 2-naphthylamine-4,8-disulfonic acid with 3-acetylaminophenyl glycine:

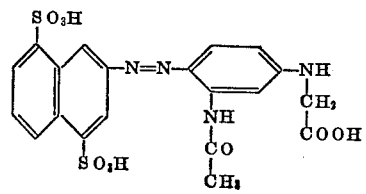

If the above chromogen is reacted with cyanuryl chloride, there is obtained a new and valuable reactive dye:

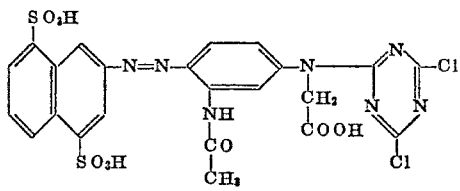
(D)

It is also possible to employ di- and polyazo chromogen groups for making the new dyes which have been discovered. In these cases, in producing the chromogen, at least two diazotization steps must be carried out, one or more couplers being employed. New and valuable reactive dyes are also obtained from this type of chromogen.

As regards the anthraquinone chromogens, any of those known may be employed, on the sole condition that the same has a radical capable of reacting with one of the chloroine atoms of the cyanuryl chloride.

Especially valuable are those anthraquinone chromogen groups obtained by reaction of 1-amino-4-bromoanthraquinone-2-sulfonic acid, its isomers and substitution derivatives with any organic amine. As an example of these amines, there may be mentioned the same amines hereinbefore mentioned for the case of azo chromogens.

Thus, for example 1-amino-4-bromoanthraquinone-2-sulfonic acid reacts with 2,4-diaminobenzenesulfonic acid to give the following chromogen especially suitable for the manufacture of said new reactive dyes:

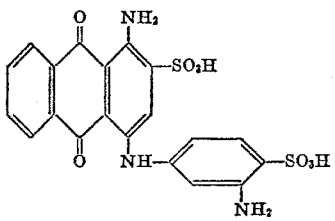

All of these dyes mentioned in the present application have functional groups capable of reacting with cellulosic materials and with polyamides. Moreover, they have the already-mentioned property that the decomposed fractions of dye are easily eliminated from the fiber by washing, thus reducing staining or discoloration to the maximum extent. The stability of the printing pastes and the dyeing liquids prepared with the same is high.

In the special cases of chemical structures $$-(CH_2SO_3H)$$

and $-(C_2H_4SO_3H)$, these properties are attributed to elimination by saponification of the group mentioned.

The reactive dyes mentioned in the present application are new chemical species which have not been known heretofore. They are especially suitable for imparting color, as by dyeing and printing, to materials such as polyamides, wool, silk, superpolyamides, regenerated cellulose and cotton, in any form in which the corresponding textile fibers may be.

The process for dyeing textile fibers using the dyes mentioned is contemplated by the present invention and is characterized by the fact that it comprises impregnating the textile material under treatment in a color bath which includes an aqueous solution of fibro-reactive triazine dyes containing at least one  radical, X being a substituent chosen from among the sulfonic, carboxylic, hydroxyl radicals and organic radicals which are of low molecular weight and strongly polar, fixing the color in alkaline medium and in the hot state and then washing and rinsing the material treated in this way, $n$ being 1 or 2.

As preferred substituents within the meaning given to the radicals $-CH_2X$ and $-C_2H_4X$, there may be mentioned the radicals $-CH_2SO_3H$, $-C_2H_4SO_3H$, $-CH_2OH$, $-CH_2COOH$, $-C_2H_4COOH$.

Among the substances forming an alkaline medium necesary for fixing the dye are alkali-metal compounds such as NaOH, $Na_2CO_3$ and $Na_3PO_4$, these being present in a proportion of 0.2 to 0.4% by weight.

The fixing of the dye is suitably effected in the hot state at a temperature ranging between 30° and 95° C., this being preceded by the salification of the bath with a strong and neutral electrolyte, such as NaCl.

Another alternative is represented by the treatment of the impregnated and dry material with a saline and alkaline solution at elevated temperature (90–95° C.) in order to fix the dye, followed by the usual washing and rinsing.

Said dyeing process forms brilliant dyes which are very fast not only to light but also to the action of other deteriorating agents.

The following examples are given to illustrate embodiments of the invention as it is presently preferred to practice it. It will be understood that these examples are illustrative, and the invention is not to be considered as restricted thereto except as indicated in the appended claims. The temperatures in the examples are indicated in ° C.

EXAMPLE 1

Cyanuryl chloride (18.5 parts) is dissolved in 100 parts of acetone. This solution is poured over a mixture of 300 parts of ice and 300 parts of water. To the suspension obtained there is added in 40 minutes a solution of 64.6 parts of the trisodium salt of the dye obtained by diazotization of 24.6 parts of 3-amino-4-sulfo-1-N-phenylglycine and subsequent coupling with 32.3 parts of 1-(2,5-dichloro-4-sulfophenyl)-3-methyl-5-pyrazolone. The acid liberated is neutralized by adding 50 parts by volume of 2 N sodium carbonate. The dye is precipitated with salt and filtered. A mixture of monopotassium phosphate and disodium phosphate is added to the cake obtained and the product is dried at reduced pressure and a temperature below 60° C. A yellowish powder is obtained which dyes cotton a greenish yellow color of high fastness.

EXAMPLE 2

Cyanuryl chloride (18.5 parts) is dissolved in 100 parts of acetone, the solution being poured over a mixture of 200 parts of water and ice. The temperature is kept below 5° C. and a solution of 22.4 parts of sodium m-toluidine-N-omega-methanesulfonate is added. The acid liberated is neutralized by adding approximately 50 parts of 2 N sodium carbonate solution. This suspension is added to a suspension of the diazo obtained in conventional manner from 30.3 parts of 2-aminophthalene-4,8-disulfonic acid. Twenty three parts of sodium acetate in the form of dilute solution are slowly added, and when the coupling has been completed the dye is precipitated with salt. The product obtained is filtered and treated with a mixture of 9 parts of monopotassium phosphate and 5 parts of disodium phosphate and is dried at reduced pressure and a temperature below 60° C. A greyish-yellow powder is obtained which dyes cotton a reddish-yellow color of high fastness.

EXAMPLE 3

Cyanuryl chloride (18.5 parts) is dissolved in 100 parts of acetone and the solution is poured over a mixture of 200 parts of water and ice. At a temperature below 5° C., there is added thereto in 40 minutes a solution of 40.7 parts of the disodium salt of N-hydroxyethyl-1-amino-8-naphthol-3,6-disulfonic acid in water. Simultaneously, 50 parts of 2 N sodium carbonate in aqueous solution are added steadily. A suspension of the diazo compound obtained from 17.3 parts of 2-aminobenzenesulfonic acid is then added. Twenty-three parts of sodium acetate in the form of dilute solution are added in the course of 4 hours. When the coupling has been completed, neutrality is established and the dye is precipitated by adding salt. The product is filtered, a mixture of monopotassium phosphate and disodium phosphate is added and drying is carried out at reduced pressure and low temperature. A violet-colored powder is obtained which dyes cotton a brilliant red color.

EXAMPLE 4

The same filter cake which is obtained in the previous example is resuspended in 300 parts of water and treated with 19.5 parts of the sodium salt of sulfanilic acid for 3 hours at a temperature of 40–50° C. A pH of 6–7 is maintained by adding sodium carbonate solution. The dye is precipitated with salt, filtered and dried at reduced pressure and a temperature of 60–70° C. A violet-red powder is obtained which dyes or prints on cotton, giving red colorings.

EXAMPLE 5

Cyanuryl chloride (18.5 parts) is dissolved in 100 parts of acetone, the solution being poured over 200 parts of a mixture of water and ice. The temperature is brought below 5° C. and a solution of 53.3 parts of the disodium salt of 1-amino - 4 - (4'-amino-3'-sulfanilino)-anthraquinone-2-sulfonic acid is added. The pH is maintained at a value of 6–7 for 3 hours by the addition of sodium carbonate in solution. A solution of 20.9 parts of sodium aniline-N-omega-methanesulfonate is added and the mixture is stirred at 40° C. for 4 hours. The dye is precipitated with salt, filtered and dried at reduced pressure. A dark blue powder is obtained which dyes and prints cotton a blue color of excellent fastness.

EXAMPLE 6

Cyanuryl chloride (18.5 parts) is dissolved in 100 parts of acetone, the solution being poured over 400 parts of water and ice. A concentration solution of 23.1 parts of p-sulfophenylglycine in water is added. The mixture is kept at a temperature below 5° C. and at a pH of 4–5 by the addition of sodium carbonate solution. A solution of 26 parts of the sodium salt of 2-amino-5-naphthol-7-sulfonic acid is added. The mixture is maintained at 40° C. and is adjusted to a pH of 6–7 by adding sodium carbonate solution. The reaction having been completed, the product is brought to positive Congo red and the intermediate is filtered and washed with brine.

The above product is dissolved in 200 parts of water, the pH is adjusted to neutrality, the solution is brought to a temperature below 5° C., and the diazo compound obtained from 18.9 parts of 2-aminophenol-4-sulfonic acid is added. The pH is brought to 8–9 with sodium hydroxide solution. When coupling is completed, 17 parts of anhydrous sodium acetate and 100 parts of 1-molar solution of copper sulphate are added. A temperature of 55° C. is maintained for 2 hours and precipitation is carried out with salt. Filtering and drying at reduced pressure are carried out. A violet-colored powder is obtained which dyes and prints cotton giving intense bluish-red colors of high fastness.

EXAMPLE 7

Cyanuryl chloride (18.5 parts) is dissolved in 100 parts of acetone and the solution is poured over 300 parts of water and ice. An aqueous solution of 13.7 parts of N-hydroxyethylaniline (as the hydrochloride) is added. The acid liberated is neutralized with dilute sodium carbonate solution. An aqueous solution of 24 parts of 2-amino-5-naphthol-7-sulfonic acid in the form of its sodium salt is added. The mixture is heated to 40° C. and the sodium carbonate solution required to maintain the pH at 6–7 is added. The mixture is heated to 40° C. and the sodium carbonate solution required to maintain the pH at 6–7 is added. The product is brought to Congo red and the intermediate is precipitated with salt and is filtered. The intermediate is resuspended and the diazo compound obtained from 23 parts of 5-acetylamino-2-aminobenzene-1-sulfonic acid is added thereto, the acidity being adjusted with sodium carbonate. The dye is precipitated with salt, filtered and dried at reduced pressure. A dark red powder is obtaine which dyes and prints cotton a brilliant scarlet color.

EXAMPLE 8

Cyanuryl chloride (18.5 parts) is dissolved in 100 parts of acetone and the solution is poured over 400 parts of water and ice. An aqueous solution of 15 parts of phenyl glycine in the form of its sodium salt is added. The acid liberated is neutralized by the addition of sodium carbonate solution. 1,3-phenylenediamino-4-sulfonic acid (18.5 parts) in solution in the form of its sodium salt is added. The mixture is heated to 40° C. for 2 hours, the pH being kept neutral by the addition of sodium carbonate solution. The product is brought to positive Congo with hydrochloric acid and the intermediate is precipitated with salt and filtered. The intermediate is resuspended in 300 parts of water and is brought to a temperature of 0° C. with ice. Twenty-seven parts of 10 N hydrochloric acid are added and diazotization is carried out with 7 parts of sodium nitrite for 2 hours. The diazotization having been completed, coupling is carried out by the addition of a solution of 42.3 parts of the disodium salt of N-benzoyl-1-amino-8-naphthol-3,6-disulfonic acid. The dye is precipitated with salt, filtered and dried at reduced pressure. A dark red powder is obtained which dyes cotton a bluish-red color having excellent fastness to washing.

EXAMPLE 9

Two parts of the dye prepared in accordance with Example 1 are dissolved in 2000 parts of water at room temperature. One hundred parts of cotton are introduced into the dye bath obtained in this way. After 20 minutes, the addition of 120 parts of sodium chloride is commenced and this is completed in another 20 minutes. The bath is now heated to 35–40° C. and 6 parts of sodium carbonate are added. The dyeing is continued for 90 minutes. The material is rinsed with plenty of cold water, then with hot water and, finally, for 30 minutes with a solution containing 2% of soap at a temperature of 90° C. The cotton is dyed a greenish-yellow color having high fastness to light and to wet treatments.

EXAMPLE 10

One hundred parts of cotton yarn are immersed in a solution of 4 parts of the dye prepared in accordance with Example 3 in 100 parts of water. The material is passed through two rollers until its weight is approximately 200 parts. The dyed material is dried at 40° C. and is then passed through a solution containing 3% sodium hydroxide, saturated with sodium chloride and at a temperature of 95° C. This alkaline solution acts as a fixing agent for the dye, it being possible for the sodium hydroxide to be replaced by sodium carbonate or bicarbonate, trisodium phosphate, and the like. The dyed material is rinsed as indicated in Example 9, and a brilliant red coloring having excellent fastness to light and to wet treatments is obtained.

EXAMPLE 11

A printing paste is prepared with 5 parts of the dye obtained in accordance with Example 5 dissolved in 40 parts of water containing 5 parts of urea. One part of sodium bicarbonate or carbonate is then added and the mixture is thickened with 50 parts of a 4% solution of sodium alginate. This paste is applied to cotton yarn by the usual printing techniques. The material obtained is dried, and evaporation is carried out at 100° C. for 10 minutes. The material is washed with cold water, then with hot water and, finally, for 30 minutes with a 2% solution of soap at a temperature of 90° C. There is obtained a printed product of blue color with excellent fastness to light and to wet processes.

What is claimed is:
1.

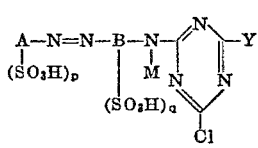

wherein

M is H or $C_nH_{2n}X$;
n is 1 or 2;
X is OH, COOH, Cl or $SO_3H$;
Y is Cl,

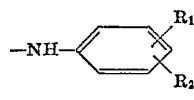

or

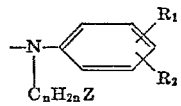

Z is OH, COOH or cl;
$R_1$ and $R_2$ are the same or different and are selected from the group consisting of H, $SO_3H$, $CH_3$, $C_2H_5$, $NO_2$, Cl, Br, COOH, $OCH_3$ and $OC_2H_5$;
p and q are each zero or an integer from 1 to 4;
A is selected from the group consisting of substituted or unsubstituted phenyl, naphthyl or pyrozalone;
B is selected from the group consisting of substituted or unsubstituted phenyl and naphthyl;
when A and B are substituted the substituents are the same or different and are selected from the group consisting of H, $SO_3H$, $CH_3$, $C_2H_5$, $NO_2$, Cl, Br, COOH, $OCH_3$ and $OC_2H_5$; and
M is H only when Y is

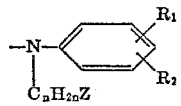

2. The reactive dyestuff of claim 1 having the formula:

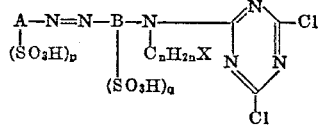

3. The reactive dyestuff of claim 1 having the formula:

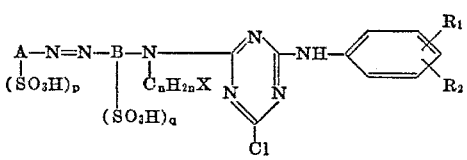

4. The reactive dyestuff of claim 1 having the formula:

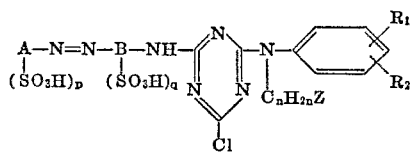

References Cited
UNITED STATES PATENTS

| | | | |
|---|---|---|---|
| 3,413,077 | 11/1968 | Bertin et al. | 260—153 X |
| 3,416,875 | 12/1968 | Ponzini et al. | 260—153 X |
| 3,522,232 | 7/1970 | Ponzini et al. | 260—146 |
| 3,121,712 | 2/1964 | Berrie et al. | 260—146 |
| 3,157,630 | 11/1964 | Stephen et al. | 260—146 |
| 3,162,628 | 12/1964 | Berrie et al. | 260—146 |
| 3,261,826 | 7/1966 | Andrew | 260—153 |
| 3,351,578 | 11/1967 | Andrew et al. | 260—153 |
| 3,453,255 | 7/1969 | Doss | 260—153 |
| 3,462,410 | 8/1969 | Schneider | 260—153 |
| 3,501,452 | 3/1970 | Bertin et al. | 260—146 |

FLOYD D. HIGEL, Primary Examiner

U.S. Cl. X.R.

8—39, 40, 41 R, 42 R, 46, 62; 260—146, 147, 242, 249